(12) United States Patent
Bamberger et al.

(10) Patent No.: US 11,128,133 B2
(45) Date of Patent: Sep. 21, 2021

(54) METHOD, FORECASTING DEVICE AND CONTROL DEVICE FOR CONTROLLING A POWER NETWORK WITH A PHOTOVOLTAIC SYSTEM

(71) Applicant: Siemens Aktiengesellschaft, Munich (DE)

(72) Inventors: Joachim Bamberger, Stockdorf (DE); Peter Mayer, Munich (DE); Andrei Szabo, Ottobrunn (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 715 days.

(21) Appl. No.: 15/774,348

(22) PCT Filed: Aug. 12, 2016

(86) PCT No.: PCT/EP2016/069227
§ 371 (c)(1),
(2) Date: May 8, 2018

(87) PCT Pub. No.: WO2017/080694
PCT Pub. Date: May 18, 2017

(65) Prior Publication Data
US 2020/0251898 A1     Aug. 6, 2020

(30) Foreign Application Priority Data

Nov. 11, 2015   (DE) .......................... 102015222210.1

(51) Int. Cl.
*H02J 3/00*     (2006.01)
*H02S 10/10*    (2014.01)
(Continued)

(52) U.S. Cl.
CPC ............... *H02J 3/004* (2020.01); *G01W 1/10* (2013.01); *G01W 1/12* (2013.01); *H02J 3/381* (2013.01);
(Continued)

(58) Field of Classification Search
CPC ........ H02J 3/004; H02J 3/381; H02J 2300/26; H02J 2203/20; H02J 2300/24;
(Continued)

(56) References Cited

U.S. PATENT DOCUMENTS

| 8,369,999 B2 | 2/2013 | Beck |
| 9,618,546 B2 | 4/2017 | Bamberger et al. |

(Continued)

FOREIGN PATENT DOCUMENTS

| CN | 103414206 A | 11/2013 |
| DE | 10 2009 024 212 A1 | 12/2010 |

(Continued)

OTHER PUBLICATIONS

Mr. Dinesh S. Borkar, Performance Evaluation of Photovoltaic Solar Panel Using Thermoelectric Cooling, Sep. 1, 2014, International Journal of Engineering Research, vol. No. 3, Issue No. 9, pp. 536-539 (Year: 2014).*

(Continued)

*Primary Examiner* — Tung S Lau
(74) *Attorney, Agent, or Firm* — Shmeiser, Olsen & Watts LLP

(57) ABSTRACT

To control a power network having a photovoltaic system, a time curve of a light radiation of the photovoltaic system is determined, wherein an increase of the time curve in relation to a reference curve of the light radiation is detected. As a result of the detection of the increase, a preparatory measure is then introduced to prepare the power network for an upcoming power drop of the photovoltaic system.

15 Claims, 2 Drawing Sheets

(51) Int. Cl.
  *H02S 10/20*  (2014.01)
  *G01W 1/10*  (2006.01)
  *G01W 1/12*  (2006.01)
  *H02J 3/38*  (2006.01)

(52) U.S. Cl.
  CPC .............. *H02S 10/10* (2014.12); *H02S 10/20* (2014.12); *H02J 2203/20* (2020.01); *H02J 2300/26* (2020.01)

(58) Field of Classification Search
  CPC ...... H02J 2300/10; H02S 10/10; H02S 10/20; G01W 1/10; G01W 1/12; Y02E 70/30; Y02E 10/56; Y02E 60/00; Y04S 10/50; Y04S 40/20
  See application file for complete search history.

(56) References Cited

U.S. PATENT DOCUMENTS

| | | | |
|---|---|---|---|
| 2010/0198420 A1 | 8/2010 | Rettger et al. | |
| 2010/0309330 A1* | 12/2010 | Beck | G01W 1/10 348/222.1 |
| 2012/0228938 A1 | 9/2012 | Thieringer et al. | |
| 2012/0306279 A1 | 12/2012 | Garabandic | |
| 2013/0033719 A1* | 2/2013 | Ieiri | G06F 1/3265 358/1.14 |
| 2014/0046610 A1 | 2/2014 | Bamberger et al. | |
| 2015/0019034 A1 | 1/2015 | Gonatas | |

FOREIGN PATENT DOCUMENTS

| | | | | |
|---|---|---|---|---|
| DE | 102009024212 A1 | 12/2010 | | |
| DE | 102009029387 A1 | 3/2011 | | |
| DE | 10 2011 017 694 A1 | 10/2012 | | |
| DE | 102011017694 A1 | 10/2012 | | |
| DE | 10 2012 215 978 A1 | 3/2014 | | |
| DE | 102012215978 | * | 3/2014 | ............. H02M 7/48 |
| DE | 102012215978 A1 | 3/2014 | | |
| DE | 10 2013 009 253 A1 | 12/2014 | | |
| DE | 102013009253 A1 | 12/2014 | | |
| EP | 2 262 096 A2 | 12/2010 | | |
| EP | 2262096 A2 | 12/2010 | | |
| EP | 102011017694 | * | 10/2012 | ............... H02N 6/00 |
| WO | WO 2007086413 | * | 8/2007 | ................ H02J 7/35 |
| WO | WO 2013046244 | * | 4/2013 | ............... G05F 3/02 |
| WO | WO 2014017141 | * | 1/2014 | ............ H02J 7/0052 |

OTHER PUBLICATIONS

A.Pradeep Kumar Yadav, Comparison of MPPT Algorithms for DC-DC, Converters Based PV Systems, International Journal of Advanced Research in Electrical, Electronics and Instrumentation Engineering, vol. 1, Issue 1, Jul. 2012 (Year: 2012).*
Office Action in related Indian Patent Application No. 201847014056, dated Jan. 27, 2020.
Non-English Chilean Office Action for application No. 201801262 dated Mar. 21, 2019.
International Search Report for PCT Application No. PCT/EP2016/069227, dated Nov. 2, 2016.
Office Action in corresponding Chinese Patent Application No. 201680066098.8 dated Sep. 18, 2020. 7 pages.
Office Action in related Chilean Patent Application No. 201801262 dated Mar. 21, 2019.
International Search Report for related PCT Patent Application No. PCT/EP2016/069227, dated Nov. 2, 2016.

* cited by examiner

METHOD, FORECASTING DEVICE AND CONTROL DEVICE FOR CONTROLLING A POWER NETWORK WITH A PHOTOVOLTAIC SYSTEM

CROSS-REFERENCE TO RELATED APPLICATIONS

This application claims priority to PCT Application No. PCT/EP2016/069227, having a filing date of Aug. 12, 2016 based off of German application No. 102015222210.1 having a filing date of Nov. 11, 2015, the entire contents of both of which are hereby incorporated by reference.

FIELD OF TECHNOLOGY

Photovoltaic systems are becoming increasingly important as renewable energy sources. However, it goes without saying that a photovoltaic system delivers power only during the day. Furthermore, the output power experiences a considerable drop when clouds move between the sun and the photovoltaic system. In order to nevertheless maintain the supply network voltage in the event of a drop in power of this kind, a further energy source is often provided in the power supply network of a photovoltaic system in order to compensate for the drop in power. Depending on the size of the photovoltaic system, a cloud-related drop in power of this kind takes place relatively rapidly, typically in the region of a few seconds in which the output power can be reduced, for example, to half or to one fifth. Effective compensation measures have to be performed quickly in order to compensate for a rapid and severe drop in power of this kind. However, compensation measures of this kind generally require a certain lead time in which, for example, a compensating diesel generator is brought to operating temperature.

BACKGROUND

For the purpose of ensuring a sufficient lead time, a weather forecast has often been used to date in order to prepare a compensating measure, for example to switch on a diesel generator and allow said diesel generator to warm up, when cloud cover is predicted. However, a weather forecast of this kind is relatively inaccurate in respect of the precise time at which shading and therefore the drop in power will occur and is therefore only suitable for rough guidance.

Furthermore, an upwardly directed camera with a fisheye lens is often used in order to measure the distribution of clouds and to prepare a compensating measure depending on this. However, reliable identification of imminent shading requires complex identification algorithms.

SUMMARY

An aspect relates to specifying a method, a forecasting device, a control device, a computer program product (non-transitory computer readable storage medium having instructions, which when executed by a processor, perform actions) and also a computer-readable storage medium for controlling a power supply network comprising a photovoltaic system, which method, forecasting device, control device, computer program product and computer-readable storage medium allow effective compensation of drops in power of the photovoltaic system.

According to embodiments of the invention, a time profile of a light irradiation of the photovoltaic system is ascertained in order to control a power supply network which has a photovoltaic system, and an increase in the time profile in relation to a control profile of the light irradiation is detected. As a result of the detection of the increase, a preparatory measure is initiated in order to prepare the power supply network for an imminent drop in power of the photovoltaic system.

A forecasting device, a control device, a computer program product and also a computer-readable storage medium are provided for carrying out the method according to embodiments of the invention.

Amongst other things, embodiments of the invention make use of the observation that a cloud which is moving in the vicinity of the line of connection between the sun and a photovoltaic system reflects a portion of the solar radiation hitting the cloud. A portion of this reflected solar radiation additionally hits the photovoltaic system, this being noticeable in an increase in the light irradiation of the photovoltaic system in relation to the control profile. This increase can be taken as a sign of imminent shading or a drop in power. In general, the increase can be detected as early as several minutes before the actual drop in power.

A significant advantage of embodiments of the invention are that probably imminent drops in power can be identified in a simple manner and appropriate countermeasures can be prepared at an early stage. Owing to the early preparation, high and/or sudden loadings on other components of the power supply network can be avoided or at least reduced. In this way, the power supply network can be stabilized and the degree of reliability of supply can be increased.

The time profile of the light irradiation can advantageously be ascertained by means of a light sensor of the photovoltaic system and/or on the basis of a voltage or power which is currently being output by the photovoltaic system and/or an output current. In this way, the time profile of the light irradiation can be ascertained with a low level of expenditure. In particular, ascertaining on the basis of the voltage, power and/or current values of the photovoltaic system often does not require any significant additional expenditure since, for example, the power of a photovoltaic system is usually continuously measured in any case.

Furthermore, the preparatory measure can comprise switching on, warming up and/or reparametrizing a further energy source of the power supply network. The further energy source used can be, for example, a diesel generator, a battery, a centrifugal force storage means and/or a conventional power plant, such as a gas power plant for example, with an adjustable power output. Owing to the preparatory measure, the further energy source can be prepared for power output or power compensation. Owing to the reparametrization, operating and control parameters of the further energy source can be changed, in particular such that a compensating power can be quickly called up when the drop in power occurs. Furthermore, the preparatory measure can comprise stepping down and/or reparametrization of the photovoltaic system. In this way, a jump in power when the drop in power occurs can be reduced. Furthermore, the preparatory measure can comprise stepping down a consumer load in the power supply network and/or redispatching in the power supply network. Owing to the redispatching, a load distribution between different energy sources in the power supply network can be briefly changed.

According to one advantageous embodiment of the invention, after initiation of the preparatory measure, an occurrence of the drop in power can be detected. As a result of this detection, a stabilization measure which is prepared by the preparatory measure can be performed for the power supply network. The stabilization measure performed can be, for example, switching a switched-on, warmed-up generator and/or a generator which runs along substantially without power to a mode for power output and/or performing another measure for power compensation.

The control profile can advantageously be ascertained from the time profile of the light irradiation. As an alternative or in addition, the control profile can also be ascertained on the basis of assumptions about a light irradiation which is to be expected in the event of undisturbed solar radiation, in particular on the basis of assumptions about the time response thereof, the gradient thereof and/or the variance thereof.

In particular, the control profile can be ascertained as a linear approximation, or an approximation which is linear in sections, of the ascertained time profile. An approximation of this kind is often also called linear fitting or fitting which is linear in sections. In this way, irregular fluctuations in the time profile can be smoothed with a low level of expenditure and a uniform control profile which can be used as a reference profile can be determined.

The increase in the light irradiation can advantageously be detected when the ascertained time profile in relation to the control profile exceeds a prespecified threshold value. For the purpose of largely avoiding false-positive forecasts, the threshold value can be prespecified such that irregular fluctuations in the time profile which are not related to clouds can generally remain below the threshold value. A threshold value of from 0.3% to 2% of the control profile or the time profile can advantageously be prespecified. The threshold value should preferably lie below 10% of the control profile or of the time profile, for example below 0.5%, 1%, 2%, 3% or 6%, since, in the case of a large number of grid codes, it is prescribed to necessarily switch on power compensation in the case of a power variation of 10% per minute. If the threshold value were to be greater than or equal to 10% in these cases, a drop in power would have been detected as early as when the power compensation according to the grid code would already have to be available. A pre-warning time would be dispensed with in these cases.

Furthermore, a variance and/or a gradient of the time profile can be ascertained in order to detect the increase in the light irradiation. The variance and/or the gradient can be ascertained, in particular, relative to the control profile here. A threshold value can be respectively prespecified for the variance and/or the gradient, the increase in the light irradiation being detected when said threshold value or values are exceeded. The statements and prespecified values provided above for prespecifying the threshold value for the time profile apply for prespecifying the threshold values for the variance and/or the gradient.

Furthermore, the increase in the light irradiation can be detected by means of a pattern identification method, a signal filter and/or a neural network. In this way, complex patterns in the time profile of the light irradiation can also be identified, as a result of which drops in power can often be predicted more accurately.

According to one advantageous development of embodiments of the invention, a value for a pre-warning time can be ascertained on the basis of a profile pattern which is detected in the time profile. The preparatory measure can then be initiated depending on the ascertained value for the pre-warning time. For example, the photovoltaic system can be stepped down more quickly and/or a generator can be brought to operating temperature more quickly in the case of a relatively short pre-warning time.

Furthermore, the increase in the light irradiation can be evaluated as a forecast of an imminent drop in power in the photovoltaic system and a corresponding forecasting signal can be output.

BRIEF DESCRIPTION

Some of the embodiments will be described in detail, with reference to the following figures, wherein like designations denote like members, wherein.

DETAILED DESCRIPTION

Figure 1:
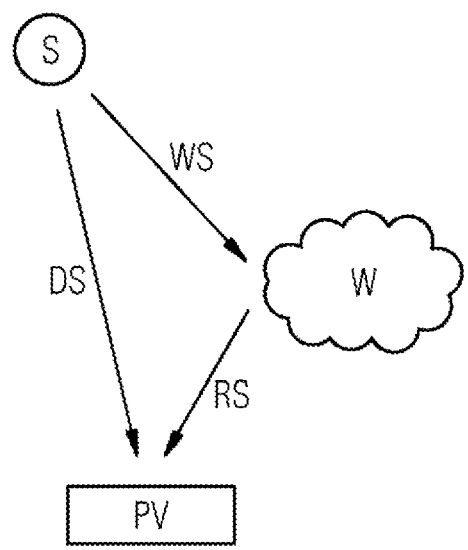
FIG. 1 shows a schematic illustration of a manner of operation of embodiments of the invention.

In order to illustrate an important operating principle of embodiments of the invention, FIG. 1 shows a schematic illustration of a photovoltaic system PV on which the sun S is shining. Direct solar radiation DS hits the photovoltaic system PV along a line of connection between the sun S and the photovoltaic system PV. As soon as a cloud W moves into the vicinity of this line of connection, a portion of the solar radiation WS which hits the cloud W is reflected from the cloud W and additionally hits the photovoltaic system PV as reflected solar radiation RS. The reflected solar radiation RS adds to the direct solar radiation DS, so that the total light irradiation of the photovoltaic system PV briefly increases as the cloud W approaches the line of connection. This increase in the light irradiation can be taken as a sign of imminent shading and therefore of an imminent drop in power of the photovoltaic system PV. In general, the increase can be detected as early as several minutes before the actual drop in power.

During the actual drop in power, the power which is output by the photovoltaic system PV generally drops to a considerably lower level within a few seconds. Owing to the detection of the increase, countermeasures against the imminent drop in power can be initiated at an early stage with a pre-warning time of generally several minutes. In contrast, in the case of exclusive detection of the drop in power which is actually taking place, only a considerably shorter reaction time of a few seconds remains in order to perform suitable countermeasures.

Figure 2:
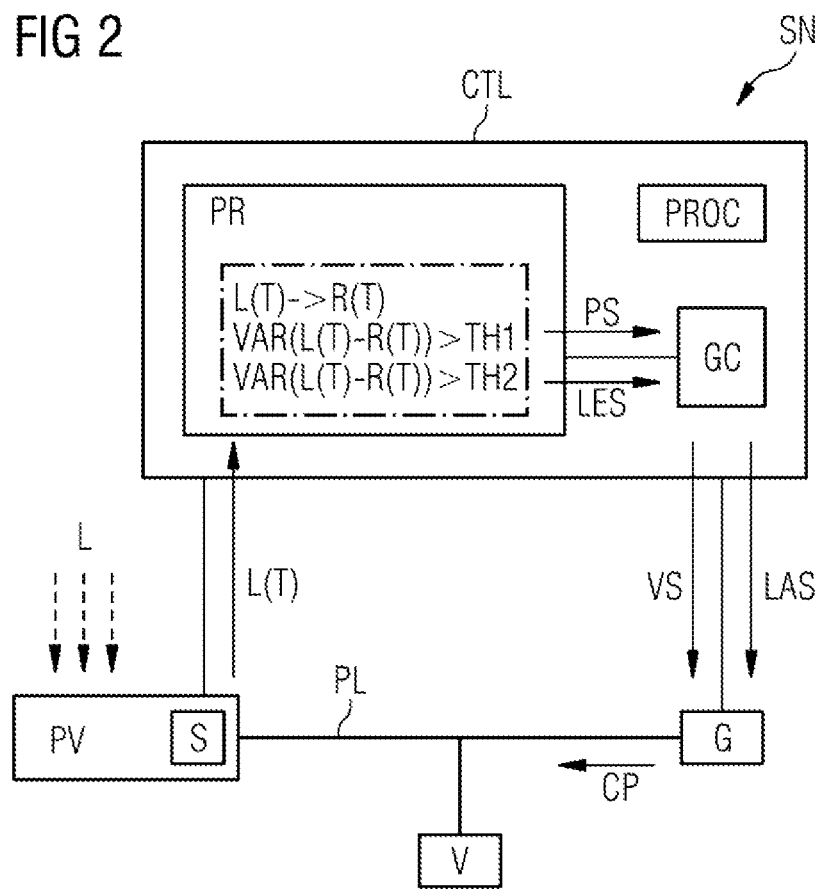
FIG. 2 shows a schematic illustration of a power supply network comprising a photovoltaic system and a power generator, in accordance with embodiments of the present invention.

FIG. 2 shows a schematic illustration of a power supply network SN, for example an electricity supply network, transmission network, distribution network, feed network or stand-alone network, comprising a photovoltaic system PV. In the present exemplary embodiment, the power supply network SN has a power generator G, for example a diesel generator, as the conventional energy source. In this case, the power supply network SN can be, in particular, a so-called stand-alone power system. As an alternative or in addition to the power generator G, a gas power plant, a nuclear power plant, a battery and/or a centrifugal force storage means for example can be provided for compensating for drops in power of the photovoltaic system PV. The photovoltaic system PV is connected to or linked with the power generator G and a consumer load V by power lines PL which are indicated by thickened lines in FIG. 2.

The photovoltaic system PV is exposed to a light irradiation L which—explained in connection with FIG. 1—can be made up of direct solar radiation DS and reflected solar radiation RS. The photovoltaic system PV has a sensor S for ascertaining a time profile L(T) of the light irradiation L. The sensor S can be a power sensor for measuring the power which is output by the photovoltaic system and/or a light sensor for measuring the light irradiation L of the photovoltaic system PV.

Measurement of a relative profile of the light irradiation L with any desired reference variable or in any desired units in connection with embodiments of the invention suffices to determine the time profile L(T). If the sensor S is implemented as a light sensor, a time profile of the lighting intensity of said sensor can be used as the time profile L(T). If the sensor S is implemented as a power sensor, the measured output power of the photovoltaic system PV, which is generally directly proportional to the light irradiation of said photovoltaic system, can accordingly be used as the time profile L(T).

The time profile L(T) is transmitted from the photovoltaic system PV to a control device CTL of the power supply network SN. The control device CTL serves to control the power supply network S and, in particular, to control the photovoltaic system PV and the power generator G. Accordingly, the control device CTL is coupled to the photovoltaic system PV and to the power generator G.

The control device CTL has one or more processors PROC for executing the method steps which are required for control purposes, a generator controller GC for controlling the power generator G and also a forecasting device PR for predicting an imminent drop in power of the photovoltaic system PV on the basis of the time profile L(T).

In order to predict the drop in power, the forecasting device PR initially ascertains a control profile R(T) from the time profile L(T). To this end, a linear approximation, or an approximation which is linear in sections, to L(T) is respectively calculated in prespecified first time windows which follow one another. In this way, irregular and random fluctuations in the time profile L(T) are smoothed in the control profile R(T).

An increase in the time profile L(T) in relation to the control profile R(T) is detected on the basis of the ascertained control profile R(T). To this end, a variance VAR of the time profile L(T) in relation to the control profile R(T) is calculated for example. In the present exemplary embodiment, a difference L(T)-R(T) is formed and the variance of the difference L(T)-R(T) is respectively calculated from said difference in successive second time windows with a length of, for example, 60 seconds. The variance VAR which is ascertained in this way is compared with a first threshold value TH1 in a respective second time window. The first threshold value TH1 can be, for example, 1% of the current control profile R(T) or time profile L(T). If the variance VAR is greater than the first threshold value TH1, it is concluded that there is a relevant increase in the light irradiation L, that is to say an increase is detected and consequently a forecasting signal PS is output. The forecasting signal PS serves as a warning signal of an imminent, cloud-related drop in power of the photovoltaic system PV with a pre-warning time of generally several minutes.

Instead of the variance VAR or in addition to said variance, a gradient and/or the increase in the time profile L(T) in relation to the control profile R(T) can also be used to detect the increase. Furthermore, a value for a pre-warning time can be estimated by identifying specific profile patterns in the time profile L(T).

The forecasting signal PS is transmitted from the forecasting device PR to the generator controller GC. This prompts the generator controller GC to initiate a preparatory measure for preparing the power supply network SN for the forecast drop in power. The preparatory measure can optionally be initiated depending on an ascertained pre-warning time. In the present exemplary embodiment, a preparatory signal VS is transmitted from the generator controller GC to the power generator G, the power generator G being switched on, reparametrized and/or prompted to warm up by said preparatory signal. The imminent preparatory measure is initiated at a time at which significant compensating power output by the power generator G is not yet required, so that a subsequent power request does not occur without the system being prepared for it. As a further preparatory measure, the power of the photovoltaic system PV can be stepped down, so that a jump in power is reduced when the drop in power occurs.

The variance VAR is continuously compared with a second threshold value TH2 in order to detect the occurrence of the drop in power. If or as soon as the variance VAR is greater than the second threshold value TH2, the occurrence of the drop in power is established and consequently a signal LES is transmitted from the forecasting device PR to the generator controller GC. Here, the signal LES indicates the actual occurrence of the drop in power. Instead of the variance VAR or in addition to the variance VAR, a gradient or the increase in the time profile L(T) in relation to the control profile R(T) can also be used in order to detect the occurrence of the drop in power. The second threshold value TH2 can be, for example, 10% of the current control profile R(T).

The signal LES prompts the generator controller GC to perform a stabilization measure or compensation measure for the power supply network SN, said stabilization measure or compensation measure being prepared by the above preparatory measure. In the present exemplary embodiment, a power output signal LAS is transmitted from the generator controller GC to the power generator G for this purpose. The power output signal LAS prompts the power generator to output in a prepared manner the power which compensates for the drop in power of the photovoltaic system PV. Consequently, the power generator G feeds a power CP, which compensates for the drop in power of the photovoltaic system PV, to the power supply network SN in order to stabilize said power supply network.

Figure 3:
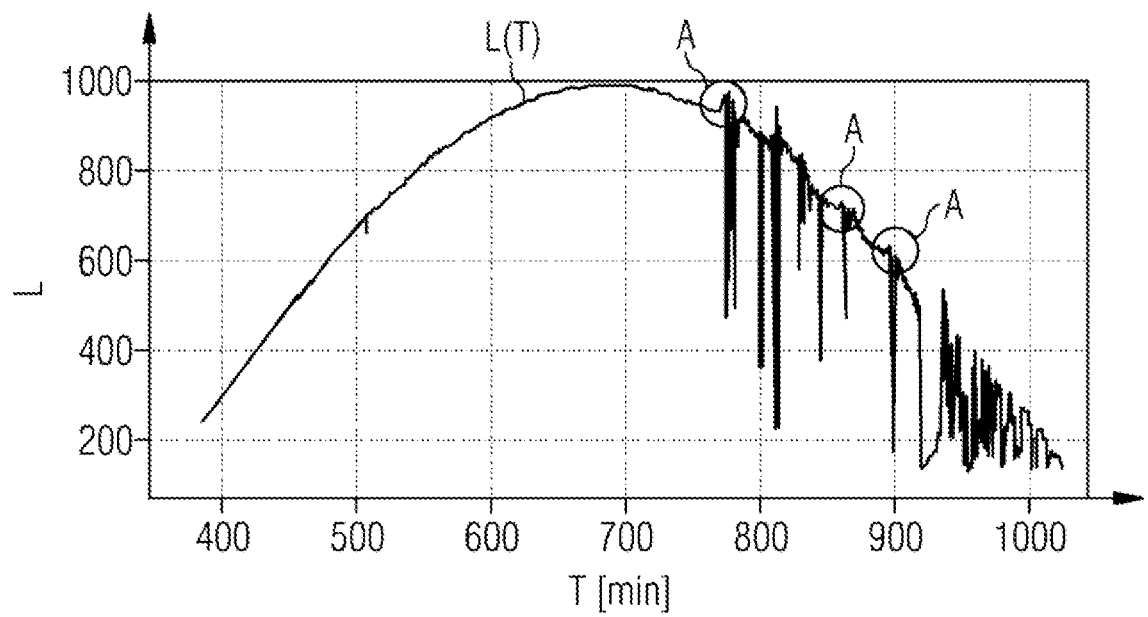
FIG. 3 shows a schematic illustration of a time profile of the light irradiation of the photovoltaic system, in accordance with embodiments of the present invention.

FIG. 3 shows a graph of a measured time profile L(T) of the light irradiation of the photovoltaic system PV. Here, the ordinate of the graph indicates the light irradiation L and in arbitrary units and the abscissa indicates the time T in minutes.

Said Figure clearly shows that the sun irradiates the photovoltaic system PV up to approximately minute 760 without obstruction. Severe cloud-related drops in the light irradiation L and therefore the power yield of the photovoltaic system PV can be established starting approximately from minute 770.

As is clearly shown in FIG. 3, the drops in power generally become clearly apparent through brief increases in the light irradiation L(T). A few exemplary increases A in the light irradiation L(T) are highlighted by circles in FIG. 3.

Figure 4:
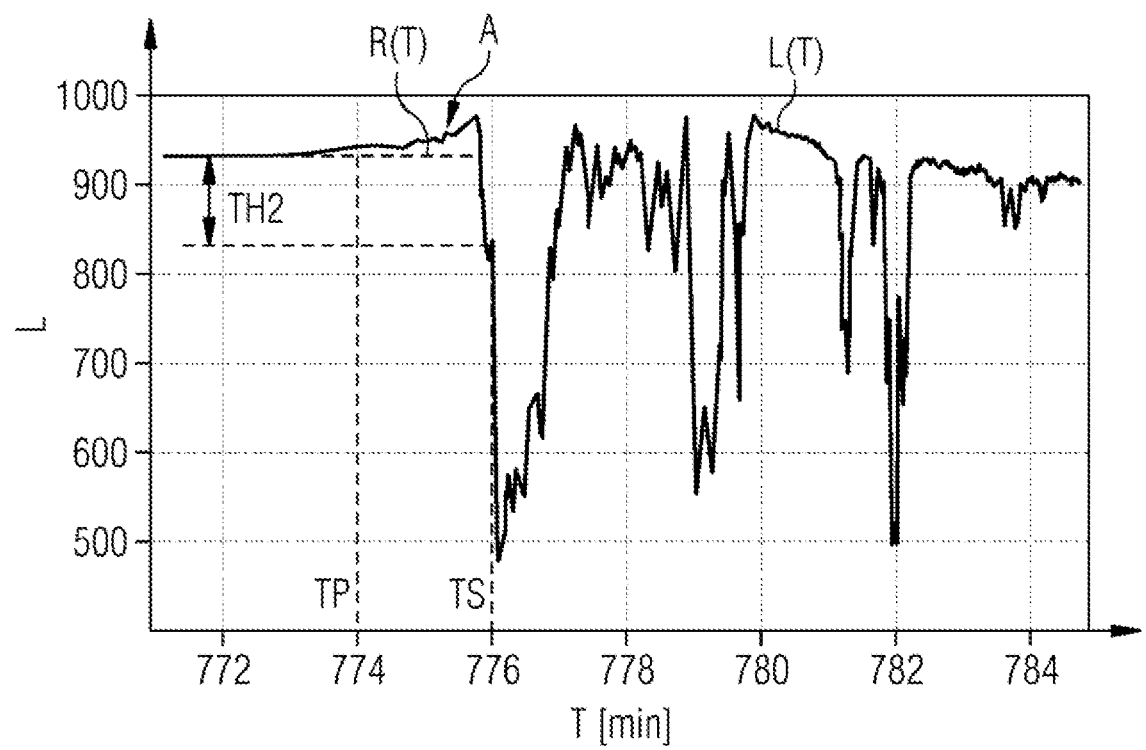
FIG. 4 shows a schematic illustration of the light irradiation at higher temporal resolution, in accordance with embodiments of the present invention.

FIG. 4 shows the profile L(T) of the light irradiation illustrated in FIG. 3 at a higher temporal resolution in the vicinity of the first drop in power which occurs approximately at minute 776. Until minute 773, the light irradiation L(T) proceeds relatively uniformly, so that a virtually constant linearized control profile R(T) is ascertained from the profile L(T) of the light irradiation. An increase A in the profile of the light irradiation L(T) in relation to the ascertained control profile R(T) is clearly shown approximately starting from minute 773. The increase A is detected as soon as the profile L(T) in relation to the control profile R(T) exceeds the first threshold value TH1 (not illustrated in FIG. 4). With the first threshold value TH1 of 1% selected for the present exemplary embodiment, this detection of the increase A takes place at time TP, here approximately at minute 774. Consequently, the forecasting signal PS and also the preparatory signal VS are output at this time TP in order to initiate the above-described preparatory measures for the imminent drop in power.

Furthermore, the deviation in the profile L(T) of the light irradiation in relation to the control profile R(T) is continuously checked in order to detect the actual occurrence of the drop in power. In the present exemplary embodiment, a check is made in respect of whether the variance of the deviation in the profile L(T) in relation to the control profile R(T) exceeds the second threshold value TH2, here 10%, for this purpose. In the present exemplary embodiment, a situation of this kind takes place at time TS, approximately at minute 776, as a result of which the actual occurrence of the drop in power is detected and consequently the above-described stabilization measures or compensation measures are performed.

In the present case, the pre-warning time, that is to say the time difference between the time TP of the detection of the increase and the time TS of the detection of the occurrence of the drop in power, is approximately 2 minutes. During this time, a compensating diesel generator can be switched on and readily brought to a sufficient operating temperature.

In fact, a relatively long measurement series showed that the pre-warning time under typical operating conditions is more than four minutes in 66% of the cases and less than 90 seconds in 14% of the cases. In particular, the pre-warning time or the time difference between initiation of the preparatory measure and detection of the actual drop in power is generally significantly greater than the time intervals within which the light irradiation L(T) significantly falls during a drop in power. As shown in FIG. 4, the light irradiation L(T) halves during the first drop in power within approximately 20 seconds and therefore far too quickly to switch on, for example, a diesel generator and bring said diesel generator to operating temperature without pre-warning. In contrast, embodiments of the invention can prepare for a stabilization measure for considerably longer than if countermeasures were taken only when the drop in power, which generally requires a response within seconds, actually occurs.

Embodiments of the invention generally do not require additional measurement devices in the photovoltaic system PV since the light irradiation of said photovoltaic system is directly reflected in its power output and the power output is continuously measured in any case. The detection of the increases can be carried out using customary means for data processing and by means of the processors which are present in power supply networks and photovoltaic systems.

By virtue of embodiments of the invention, the degree of reliability of supply can be increased since drops in power can be identified at an early stage and countermeasures can be initiated at an early stage. Embodiments of the invention can also be advantageously used in power supply networks which contain a storage means for capturing drops in power because compensating generators can be switched on at an early stage owing to the pre-warning. In this way, deep-discharge cycles of the storage means can be at least partially avoided, this in turn reducing aging of the storage means or wear of the storage means.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

The invention claimed is:

1. A method for controlling a power supply network having a photovoltaic system, the method comprising:
   a) ascertaining a time profile of a light irradiation of the photovoltaic system;
   b) detecting an increase in the time profile in relation to a control profile of the light irradiation; and
   c) as a result of the detection of the increase, initiating a preparatory measure to prepare the power supply network for an imminent drop in power of the photovoltaic system, wherein the preparatory measure comprises: warming up and reparametrizing a further energy source of the power supply network, and
   redispatching in the power supply network.

2. The method as claimed in claim 1, wherein the time profile of the light irradiation is ascertained by means of a light sensor of the photovoltaic system and/or on the basis of a voltage or power which is currently being output by the photovoltaic system and/or an output current.

3. The method as claimed in claim 1, wherein, after the initiation of the preparatory measure, an occurrence of the drop in power is detected, and in that, as a result of the detection of the occurrence of the drop in power, a stabilization measure which is prepared by the preparatory measure is performed for the power supply network.

4. The method as claimed in claim 1, wherein the control profile is ascertained from the time profile of the light irradiation.

5. The method as claimed in claim 1, wherein the increase in the light irradiation is detected when the ascertained time profile in relation to the control profile exceeds a prespecified threshold value.

6. The method as claimed in claim 1, wherein a variance and/or a gradient of the time profile are/is ascertained in order to detect the increase in the light irradiation.

7. The method as claimed in claim 1, wherein the increase in the light irradiation is detected by means of a pattern identification method, a signal filter and/or a neural network.

8. The method as claimed in claim 1, wherein a value for a pre-warning time is ascertained on the basis of a profile pattern which is detected in the time profile, and in that the preparatory measure is initiated depending on the ascertained value for the pre-warning time.

9. The method as claimed in claim 1, wherein the increase in the light irradiation is evaluated as a forecast of an imminent drop in power in the photovoltaic system and a corresponding forecasting signal is output.

10. A forecasting device for a power supply network comprising a photovoltaic system, designed in order to execute the method as claimed in claim 1.

11. A control device for controlling a power supply network which has a photovoltaic system, designed in order to execute the method as claimed in claim 1.

12. A computer program product, comprising a computer readable hardware storage device having computer readable program code stored therein, said program code executable by a processor of a computer system to implement the method for controlling a power supply network which has a photovoltaic system, as claimed in claim 1.

13. The method as claimed in claim 4, wherein the control profile is ascertained as a linear approximation, or an approximation which is linear in sections, of the ascertained time profile.

14. A computer-readable storage medium comprising the computer program product as claimed in claim 12.

15. A method for controlling a power supply network having a photovoltaic system, the method comprising:
   a) ascertaining a time profile of a light irradiation of the photovoltaic system;
   b) detecting an increase in the time profile in relation to a control profile of the light irradiation; and
   c) as a result of the detection of the increase, initiating a preparatory measure to prepare the power supply network for an imminent drop in power of the photovoltaic system, wherein the preparatory measure comprises: stepping down and reparametrizing the photovoltaic system; and
redispatching in the power supply network.

* * * * *